Aug. 26, 1952 R. D. MOYER 2,607,996

APPARATUS FOR MEASURING, INDICATING, AND RECORDING TRUE VERTICAL AND HORIZONTAL DISTANCES

Filed Oct. 23, 1945 8 Sheets-Sheet 1

INVENTOR

Ralph D. Moyer

BY Duell, Kane & Smoot

ATTORNEYS

Aug. 26, 1952 R. D. MOYER 2,607,996

APPARATUS FOR MEASURING, INDICATING, AND RECORDING TRUE VERTICAL AND HORIZONTAL DISTANCES

Filed Oct. 23, 1945 8 Sheets-Sheet 2

INVENTOR

Ralph D. Moyer

BY Duell, Kane & Smoot

ATTORNEYS

INVENTOR
Ralph D. Moyer
BY Duell, Kane & Smart
ATTORNEYS

Aug. 26, 1952 R. D. MOYER 2,607,996

APPARATUS FOR MEASURING, INDICATING, AND RECORDING TRUE VERTICAL AND HORIZONTAL DISTANCES

Filed Oct. 23, 1945 8 Sheets-Sheet 4

INVENTOR

Ralph D. Moyer

BY Duell, Kane & Smart

ATTORNEYS

Aug. 26, 1952 R. D. MOYER 2,607,996

APPARATUS FOR MEASURING, INDICATING, AND RECORDING
TRUE VERTICAL AND HORIZONTAL DISTANCES

Filed Oct. 23, 1945 8 Sheets-Sheet 5

INVENTOR
Ralph D. Moyer
BY Duell, Kane & Smart
ATTORNEYS

Aug. 26, 1952 R. D. MOYER 2,607,996

APPARATUS FOR MEASURING, INDICATING, AND RECORDING TRUE VERTICAL AND HORIZONTAL DISTANCES

Filed Oct. 23, 1945 8 Sheets-Sheet 6

INVENTOR

Ralph D. Moyer

BY Dull, Kane & Smoot

ATTORNEYS

Aug. 26, 1952 R. D. MOYER 2,607,996

APPARATUS FOR MEASURING, INDICATING, AND RECORDING TRUE VERTICAL AND HORIZONTAL DISTANCES

Filed Oct. 23, 1945 8 Sheets-Sheet 7

INVENTOR

Ralph D. Moyer

BY Dull, Kaul & Smoot

ATTORNEY

INVENTOR
Ralph D. Moyer
BY
Duell, Kane & Smart
ATTORNEYS

Patented Aug. 26, 1952

2,607,996

UNITED STATES PATENT OFFICE 2,607,996

APPARATUS FOR MEASURING, INDICATING, AND RECORDING TRUE VERTICAL AND HORIZONTAL DISTANCES

Ralph D. Moyer, Dunbar, Pa.

Application October 23, 1945, Serial No. 623,984

6 Claims. (Cl. 33—141.5)

This invention relates to mechanism for continually recording true horizontal and vertical distances and/or for continually plotting true distances and directions traversed by a vehicle in which the mechanism is mounted.

In making surveys to obtain, for example, the profile of the terrain over which a road, pipe line, or the like is to be run, it is now usual to dispatch a surveying party over the route to determine, using conventional surveying equipment, the angles and distances of ascent or descent of the proposed route. The notes and figures made by the party then serve as the basis for calculations which derive the true vertical and horizontal distances of the terrain which has been surveyed, and a profile section is then drawn to suitable scale.

Similar difficulties and tedious calculations attend the mapping of a route to show the horizontal distances and directions over which the ultimate structure is to run.

It is particularly difficult to determine the profile of submerged terrain, such as the profile of a river or harbor bed. In the latter instance, it has been necessary for the surveying party to cross the body of water in boats, taking periodic soundings the locations of which are determined by a second group of surveyors on the river or harbor bank. Such soundings, when reduced to graphic form, show only the approximate profile or subsurface condition. Frequently unexpected depressions or obstructions will be found within the confines of the area or between selected points at which the soundings were made, and in running submerged pipe lines, for example, it has at times been necessary to reroute the pipe lines because of these unforeseen and unpredictable subsurface conditions.

The present invention affords means whereby the true vertical and horizontal distances of the proposed route may be continually and accurately plotted as a vehicle or car containing the equipment is pushed or otherwise propelled over the line of survey. For profiling, the mechanism continually determines the true horizontal and vertical distances traversed, as well as recording the actual distance of travel. For mapping, or plotting, the mechanism may additionally inscribe on a separate chart, the true horizontal projection of the distance traversed regardless of whether the mechanism has been propelled over ascending or descending paths.

As presently considered, it is contemplated that the invention will have its greatest applicability in profiling and sectioning, to provide a basis for earthwork computations and to afford means of economically and quickly ascertaining the status of earth-moving or earth-filling operations at periodic intervals.

It is a feature of the invention that the car containing the automatic calculator may be drawn or otherwise moved across submerged terrain, and the recording mechanism may be mounted in a boat containing the observation party. For extended under-water distances, such as wide rivers, or harbors, it is entirely feasible for a diver to push or draw the carriage over the bottom, and the actual route taken by the diver during such under-water transit is continually shown to the observation party on the surface. Hence, should the diver unknowingly deviate from the initially proposed route, his attention can be called to such deviation by intercommunicating telephone, and he can either correct his movement or explain to the observation party what sub-surface condition necessitated the deviation.

It is a principal object of the invention to provide means for continually and automatically calculating and recording true vertical and horizontal distances traversed by a carriage or the like containing the apparatus.

It is another object of the invention to provide means whereby a continuous profile, for example, may be recorded as a carriage or other vehicle containing the equipment traverses a proposed route.

It is yet another object of the invention to provide improved means whereby the relative speed and direction of movement of a stylus with respect to a plotting sheet may be continually made a function of the angle of ascent or descent of the vehicle, and/or the deviation of a vehicle from an established directional meridian.

It is another object of the invention to provide means whereby a recording mechanism may be driven at speeds proportional to the angles of ascent or descent, or deviation of the mechanism from an established meridian or preestablished direction of travel.

It is another object of the invention to provide a surveying instrument in which certain trigonometric functions of the angles of ascent or descent of a vehicle, or the course of the vehicle with respect to an established meridian, may be continually and automatically analyzed to establish the true horizontally and vertically projected distances over which the vehicle has run.

It is yet another object of the invention to provide apparatus having recorder means which will continually show the deviation of the apparatus from a horizontal plane, or from a meridian.

It is another object of the invention to provide a surveying instrument of the class described in which the means for automatically analyzing the trigonometric functions of the angles of deviation of the equipment from a vertical or horizontal plane may be separated from the recording equipment, whereby the mechanism, for example, may be run along a submerged route.

It is yet another object of the invention to provide a surveying instrument whereby at every desired unit of true horizontal distance, a suitable station mark may automatically be made on the terrain over which the instrument is travelling.

Other features and advantages will hereinafter be apparent from the detailed description of the invention which follows.

GENERAL DESCRIPTION OF THE APPARATUS

*Profile recording*

Figure 1:
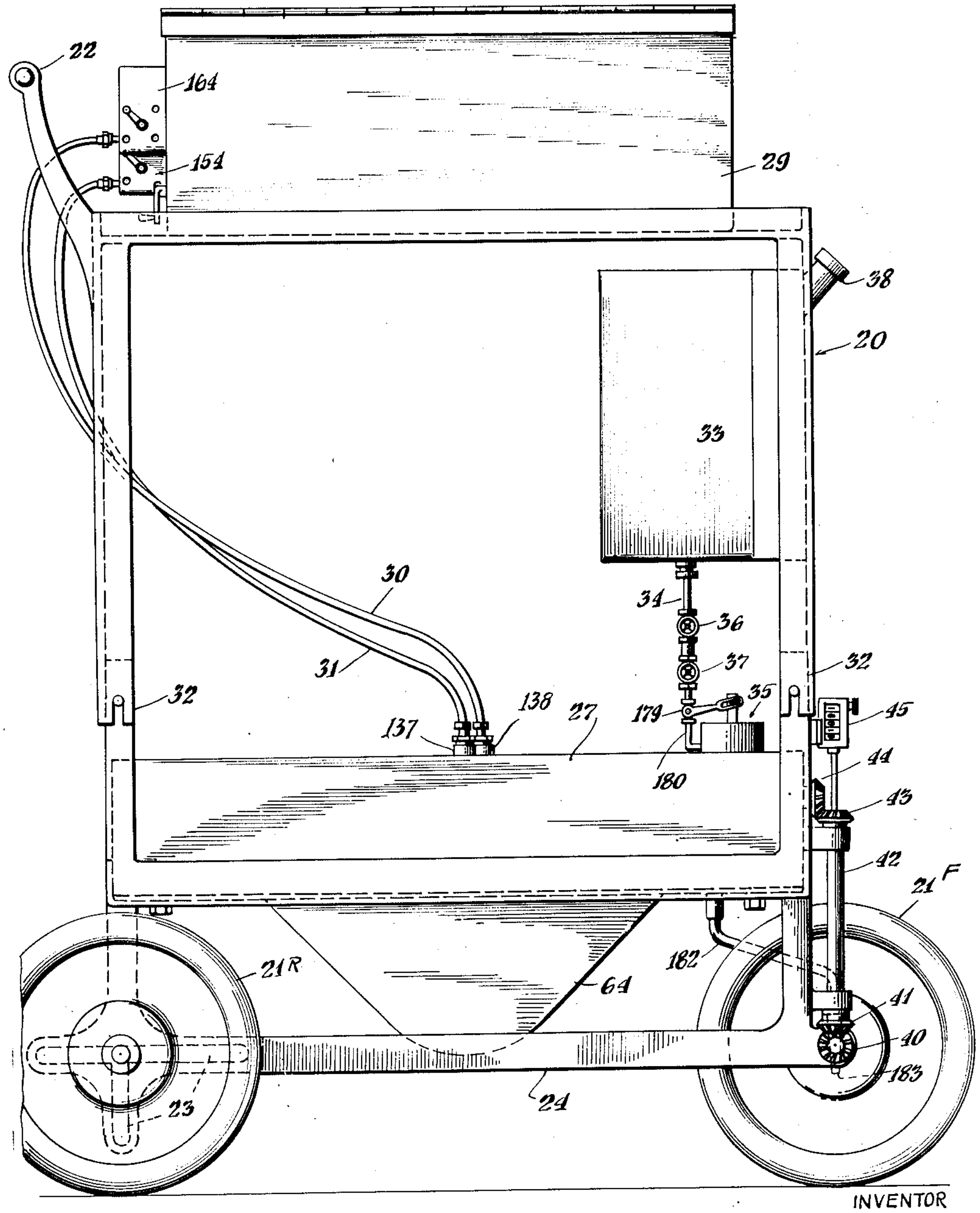
Fig. 1 is a side elevation of one embodiment of the invention, showing a typical carriage suitable for profile surveying and plotting, and cross sectioning.

Referring to Fig. 1, the invention is illustrated as in association with a carriage 20 mounted on wheels 21F, 21R, and arranged to be propelled over the surface for which a profile or section is to be obtained. As illustrated, the carriage 20 is intended to be manually pushed and hence has a handle 22; it is obvious that the invention may be incorporated in a trailer or the like adapted to be towed by a vehicle, or otherwise propelled.

The wheels 21 may be of any suitable diameter as may be the wheel base thereof. The diameter of the wheels, as well as the wheel base, is largely influenced by the terrain or surface to be surveyed. For example, relatively small wheels are preferred for a surface having ditches or abrupt curves of relatively small radius, whereas large diameter wheels are more suitable for a surface whose profile curves are gradually undulating or of relatively large radius. For submarine work, relatively large diameter wheels are essential; and to overcome the inherent buoyance of the structure, submarine surveys may require that the carriage be suitably ballasted.

In exemplifying the present invention, it will be considered that the circumference of the wheels 21 is exactly five feet.

Figures 2, 5, 6:
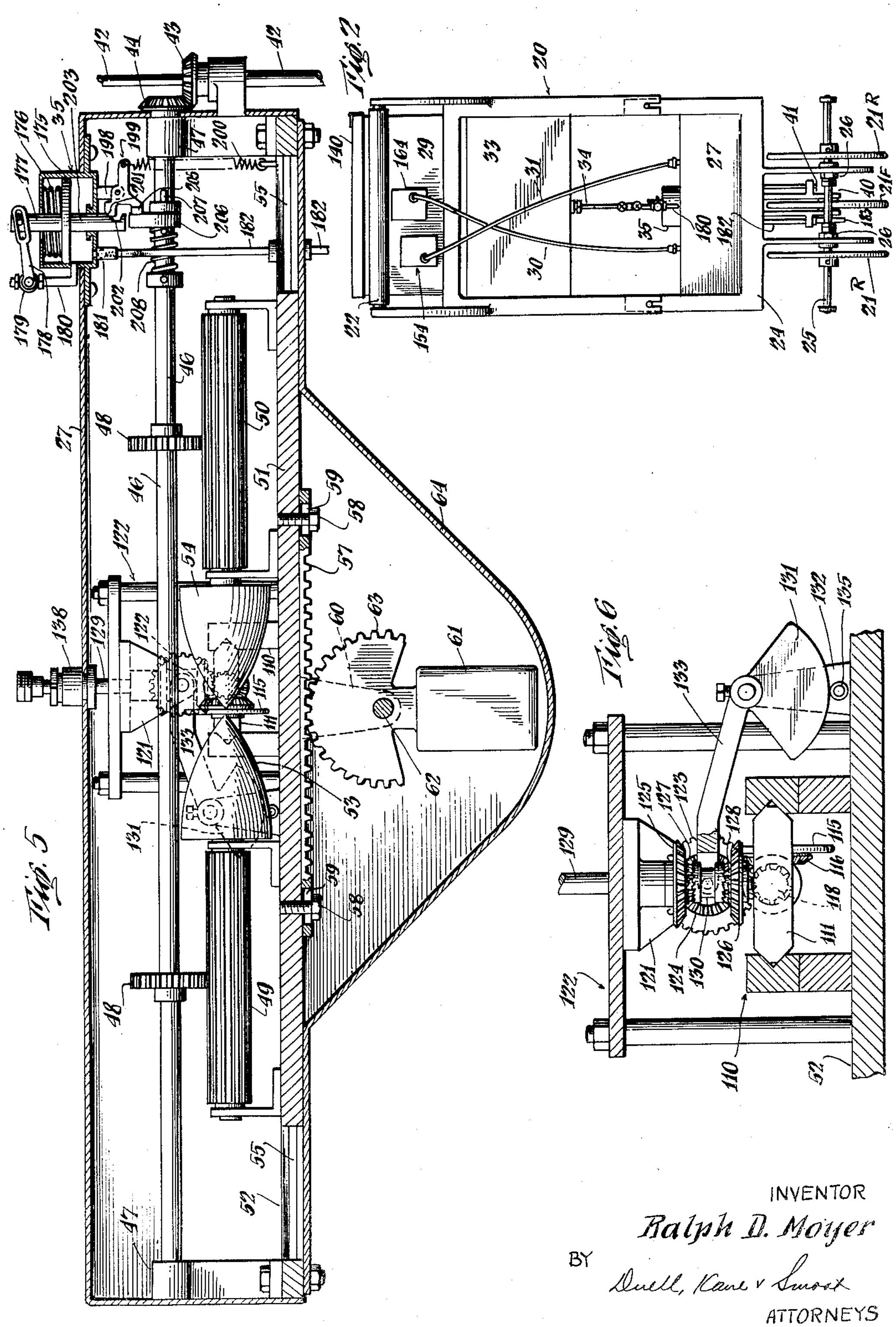
Fig. 2 is a rear elevation of the same.
Fig. 5 is a side elevation of the proportional-speed drive mechanism and station-marking operator.
Fig. 6 is a side elevation, partly in section, taken on lines 6—6 of Fig. 4.

It is presently contemplated, see Fig. 2, that the carriage will comprise a three wheel chassis, the single wheel 21F being at the front of the unit; this may be changed as desired. By the illustrated horizontal and vertical slots 23 in the rear of the lower chassis member 24, the location of the axle of the rear wheels may be so positioned as to shorten or lengthen the wheel base, or to lower the rear wheels with respect to the front wheel to meet peculiar or unusual conditions in the field. As appears in Fig. 2, the rear wheels 21R are mounted on a relatively long axle 25, secured in the desired position on the rear of chassis member 24 by nuts 26 carried by threaded portions of the axle. It is obvious, therefore, that the said axle may be positioned as desired within the slots 23 and secured by tightening the nuts.

It would be desirable to adjust the rear wheels, for example, in making a profile survey of a large-diameter pipe line. In such a survey, the carriage would be pushed along the pipe line, the front wheel resting on the top center of the pipe and the rear wheels spread and lowered to such an extent that the lower carriage frame is in parallelism with the pipe line.

The proportional-speed drive mechanism for the recorder is preferably mounted at a low point in the carriage, and is contained within a completely water-tight chamber 27 suitably fixed to the lower carriage frame and parallel therewith.

The recording mechanism may be mounted at the top of the carriage, in a water-proof and weather-tight chamber 29, and flexible shafting 30, 31 provides a mechanical driving connection between the proportional-speed mechanism and the recorder mechanism.

For a reason later to be explained, it is preferable to provide the four vertical posts of the carriage with a separable joint such as illustrated at 32 so that when crossing a stream bed or other body of water, the lower portion of the carriage, containing the proportional speed mechanism, may be pushed or towed across the bed of the stream beneath the surface of the water, whereas the recording mechanism may be mounted in a boat or otherwise transported on the surface of the water. In such use it is obvious that the flexible shafts 30, 31 will be replaced with suitably longer shafts according to the depth of the water to be traversed.

The carriage also supports a container 33 of marking fluid so that at desired or calculated intervals, a quantity of said fluid may be projected against the surface traversed by the carriage, to establish survey stations at which, according to customary surveying procedure, stakes may be driven.

Obviously, it is unnecessary to make such identifying markers on a stream bed or the like and it is contemplated that the conduit 34 from the container 33 to the discharge pump 35 may be provided with union-end valves 36, 37, so that upon the raising of the upper carriage portion, the conduit 34 may be removed and the valve ends plugged.

A suitable capped filler connection 38 may be provided for the container 33.

*Proportional-speed mechanism*

The measurement of true horizontal and vertical distances depends upon the resolution of a slope distance, for example, into its vertical and its horizontal components. For example, when the carriage is moving along a bank having a slope of 45 degrees from the horizontal an actual travel of approximately 7.07 feet along the surface resolves into a true horizontal movement of five feet and a true vertical movement of plus or minus five feet according to whether the carriage is climbing or descending the slope. The resolution of angular ascent or descent to its vertical and horizontal components results from the application of the sine and cosine functions of the angle of ascent or descent. In the present invention, such angular functions are continuously and automatically analyzed and are expressed in terms of relative speed of movement of the recording chart beneath a stylus for true horizontal distance of travel, and in the speed of movement of the stylus vertically with respect to the axis of movement of the chart, for the true vertical ascent or descent.

Figure 3:
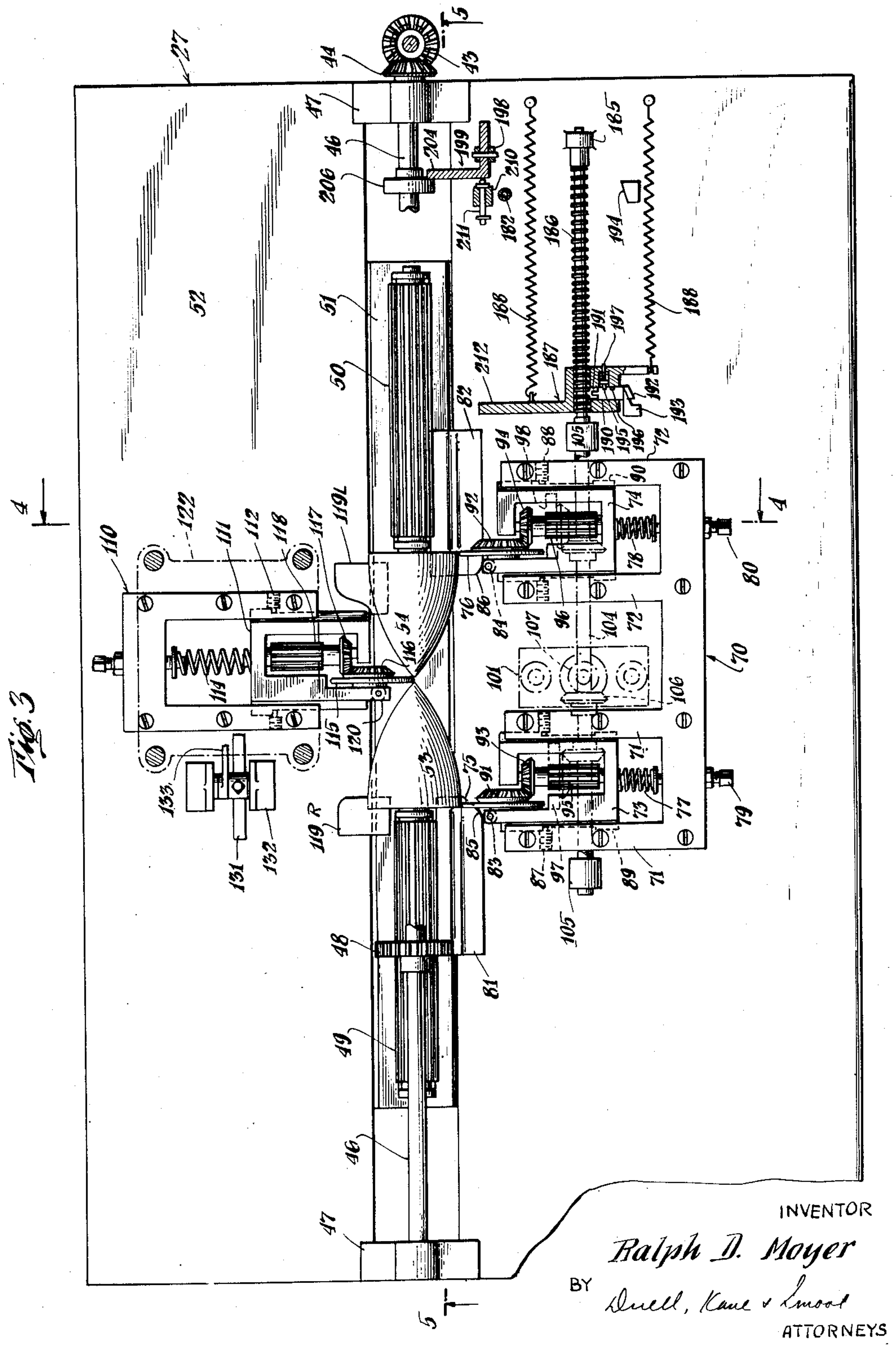
Fig. 3 is a plan view of the proportional-speed drive mechanism with elements of the station-marking operator shown in section.
Figure 4:
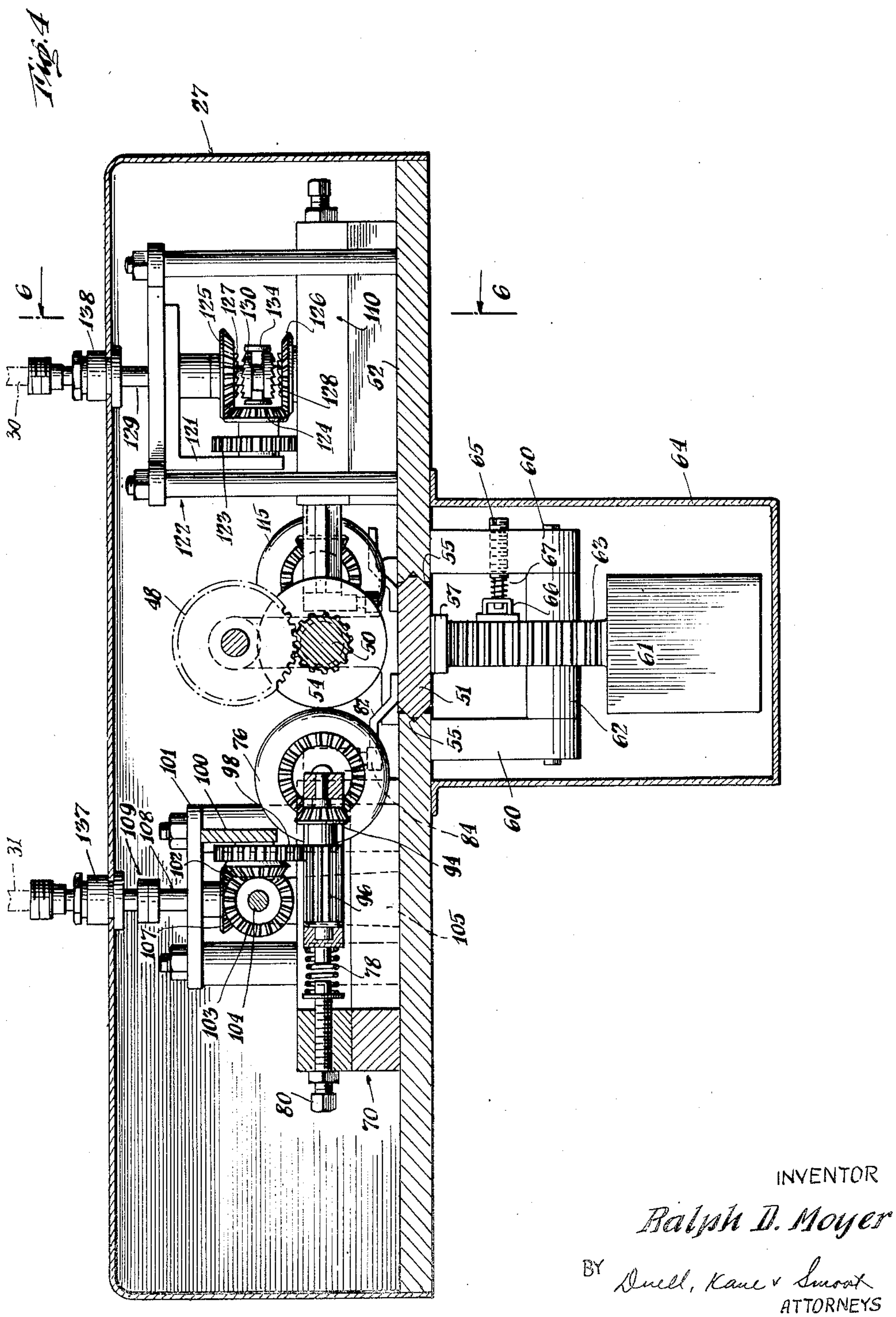
Fig. 4 is an end elevation of the proportional-speed drive, partly in section, taken on lines 4—4 of Fig. 3.

Figs. 3, 4, and 5 illustrate one form of mechanism for driving the chart and stylus at a speed proportional to the trigonometric functions of the angle of ascent or descent of the carriage. As previously stated, the front wheel 21F has an accurately known circumference so that each revolution of the wheel represents a known travel of the carriage. By means of a gear 40 fixed for rotation with the front wheel, see Fig. 1, and a cooperating gear 41 of preferably 1 to 1 ratio, a vertical shaft 42 rotatably supported on the carriage frame as shown will drive a gear 43 fixed thereto. Said gear 43 meshes with and drives a gear 44, also a 1 to 1 ratio so that each revolution of gear 44 corresponds to one revolution of the wheel 21F. Hence, each revolution of gear 44 represents, for example, five feet of actual travel of the wheel over the surface being surveyed. An odometer 45 driven by an extension of shaft 42 affords a running record of actual travel.

It will be understood that the gearing, odometer, etc., will be enclosed in a suitable water-tight housing (not shown).

Gear 44 is fixed to the end of a shaft 46 suitably mounted on bearings 47 within the housing 27. Fixed to said shaft for rotation therewith are gears 48 (only one of which is shown in Fig. 3), which respectively mesh with elongate gears 49, 50, rotatably mounted in brackets secured to a bed plate 51 which is slidably mounted in the base 52 of the housing 27. To the shafts of the respective gears 49, 50 are affixed the respective drive cones 53, 54. The surfaces of said cones are accurately formed to a sine-cosine curve derived by plotting the natural trigonometric functions from zero to ninety degrees along a base line of suitable length. As indicated in Figs. 3 and 5, the respective cones 53, 54 are precisely concentric, and are preferably so mounted that their apexes do not quite touch.

The slidable mounting of the bed plate 51 is advantageously accomplished by providing grooved tracks 55 in the housing base 52, as shown in Fig. 4. The underside of the bed plate 51 carries a rack 57 adjustably affixed to said bed plate by such means as the bolts 58 passing through elongate slots 59 at the ends of the rack, and into the bed plate. A plumb weight 61 is pivotally carried by shaft 62 rotatable in brackets 60 affixed to the base 52. Extending upwardly from the plumb weight, and rigidly secured thereto, is a segmental gear 63 in mesh with the rack 57. The plumb weight and its associated mechanism may be contained within the removable water-tight housing 64.

The rack 57 is so positioned that when the carriage is on a precisely horizontal surface, the midpoint between the apexes of the cones 53, 54 is in a vertical plane at right angles to the axis of rotation of the cones, said plane passing through the axis of rotation of the shaft 62 and the center of gravity of weight 61. It is apparent that the weight 61 always assumes a plumb line and that where the carriage enters upon a sloping surface there will be a rotation of the gear 63 which will cause the rack 57 and its thereupon mounted cones 53, 54 and gears 49, 50, to shift in one or another direction with respect to the axis of rotation of gear 63. For example, if the carriage as shown in Fig. 5 slopes downwardly to the right, the gear 63 will have an effective counterclockwise rotation which will shift rack 57 and the associated cones to the left an amount in proportion to the value of the angle of descent of the carriage. Correspondingly, an upward angle of travel of the carriage will result in a shifting of the rack and cones to the right.

The gears 49, 50 will shift relatively to the drive gears 48, but it is obvious that there is no interruption of drive of gears 49, 50, by the gears 48.

It is desirable that the pendulum swing of the plumb weight and its associated gear be dampened to minimize oscillations thereof. Accordingly, an adjustable dampening mechanism such as the screw 65 passing through the vertical center line of one of the brackets 60 has a reduced diameter end which slidably mounts a dampener 66, there being a spring 67 interposed between said dampener and the shoulder of the screw 65 to frictionally hold the surface of dampener 66 against the gear. By adjusting the tension of the spring 67 by screwing or unscrewing 65, the dampening pressure against the gear 63 may be regulated as desired. Dashpot dampeners or other conventional means may be employed in lieu of a mechanical dampener if desired.

The receptive position of the cones at any instant is used to drive chart shifting and stylus shifting elements at speeds proportional to the sine and cosine of the angle of inclination or declination of the carriage with respect to the horizontal. Hence, the cones afford the basis of continually resolving angular sloping surfaces into their vertical and horizontal components. As previously stated, the horizontal components are translated into chart designations by movement of a chart in a longitudinal direction beneath a stylus or other marking device. It will be apparent that as the surface being traversed approaches the horizontal, the chart should be speeded up for the reason that the projected horizontal component of the actual path traversed becomes more nearly equal to the said actual path. As the angle becomes steeper and the horizontal component necessarily less, the movement of the chart must be less rapid in order to record the shortened horizontal component.

The proportional-speed chart drive includes a bracket or frame 70 securely fixed to the base 52 of the casing 27. Guideways 71, 71, and 72, 72 disposed at right angles to the axis of rotation of the cones slidably mount the respective carriages 73, 74 at the end of each of which is rotatably supported a drive wheel, respectively 75, 76 maintained in normal engagement with the adjacent cone under the urging of the respective springs 77, 78, the tension of which may be adjusted by means of the illustrated set screws 79, 80. In order to better the frictional engagement of the respective drive wheels with the cones, the cones may be given a knurled or serrated finish or may be treated with rubber or like high-friction material. The center to center spacing of the wheels 75, 76 is equal to the base to base distance of the cones.

The wheels 75, 76 are shown in Fig. 3 at the cone locations which correspond to horizontal movement of the carriage, and hence maximum speed of rotation of the said wheels. It is apparent that if the bed plate 51 and its associated cones shift to one or another direction according to the ascent or descent of the carriage, one of the cones will disengage from its associated wheel.

For example, a shifting of the bed plate to the right of Fig. 3 will cause the cone 53 to be carried to the right and the wheel 75 will be out of contact therewith. Inasmuch as the carriage 73 which supports the wheel 75 is continually urged in the direction of the cones by the spring 77, suitable stop means must be provided to prevent the spring from driving the carriage and associated wheel 75 inwardly; for if this were permitted, the return travel of the bed plate would cause the end of the cone 53 to strike against the side surface of the wheel 75 and would prevent further movement of the bed plate 51 except at the expense of considerable damage to the cone and wheel. Accordingly, there is provided adjacent each cone a stop rail, respectively 81, 82, the forward edge of which extends upwardly as shown in Fig. 4 for cooperation with a roller 83, 84 fixed to a forward projection of the respective carriages. The relationship of each stop rail and roller is such that the respective wheels 75, 76 travel along a path parallel to the line of tangency of the respective cones at the bases thereof and slightly spaced therefrom. As is shown in somewhat exaggerated scale in Fig. 3, the ends 85, 86 of the respective stop rails are sloped so that the wheel 83, for example, riding up the slope 85 will move the wheel 75 out of engagement with the cone and on reverse movement, said wheel will again engage with the cone.

Also, it is apparent that when the cones shift to such an extent that one or another of the wheels 75 or 76 will be at the apex of a cone it is desirable to limit the travel of the carriage so that a wheel may not become jammed between the cones. Accordingly, the respective guide rails of the frame 70 have stops 87, 88 therein, said stops engaging with shoulders 89, 90 provided in the respective carriages 73, 74. The said stops are so positioned that neither wheel will engage with a cone when said wheel is at the point of separation of the respective cones.

Each drive wheel has affixed thereto for rotation therewith a gear, respectively 91, 92, and said gears mesh with the respective gears 93, 94 concentrically fixed to which are the elongate spur gears 95, 96.

As clearly appears in Fig. 4, the last-named gears are mounted for rotation in the respective carriages 73, 74, and cooperate with spur gears 97, 98, said gears being carried by a transverse member 100 of a frame 101 mounted on the base 52 and extending parallel with the axis of the cones. By means of gearing such as the bevel gearing 102, 103, illustrated in Fig. 4 (said gearing being duplicated above each carriage 73, 74), the rotation of the gears 97, 98 rotates the horizontally disposed shaft 104 mounted in the bearing posts 105. A gear 106 on shaft 104 meshes with and drives a gear 107 fixed to the end of a rotatable shaft 108, which may be journaled in the frame 101. It is seen, therefore, that the rotation of either or both of the drive wheels 75, 76 will result in a rotation of the vertical shaft 108, the ratio of speeds of rotation being as desired, and according to the drive ratios of the respective gears.

When the carriage is on a horizontal plane, the respective wheels 75, 76 are at the points of maximum diameter of the associated cones 53, 54 and rotation of the cones by reason of movement of the carriage along said horizontal plane, will drive the wheels at maximum speed. This position of the wheels with respect to the cones corresponds to the natural cosine of a zero degree angle, to wit, 1.00. On the horizontal, therefore, the chart, as later explained, will be driven at maximum speed. As the angle of inclination, for example, increases, the cone carriage will be shifted to the right of Fig. 5 as previously explained, and wheel 75 will disengage from its associated cone 53, whereas wheel 76 will follow the contour of the cone 54 toward its center point, according to the steepness of the angle of ascent. Through the illustrated gearing, the shafts 104 and 109 will be rotated at lessening speeds until, for a vertical path of movement, said shafts have no rotation because the wheel 76 does not rotate, the natural cosine of 90 degrees being zero.

Shaft 108 is provided with a suitable one-way drive clutch 109.

For travel on declining slopes, it is apparent that the wheel 75 would be the drive wheel for the shafts 104, 108, and wheel 76 will be idly rotating.

Similar means are used for obtaining a proportional speed drive for recording true vertical distances. The base plate 52 fixedly supports a frame 110 having channeled guide rails within which slides a carriage 111 in directions perpendicular to the axis of rotation of the cones. A stop 112 limits the forward movement of the carriage, and an adjustable tension spring 114 acts as the propulsion means for the carriage. A forward arm of the carriage rotatably mounts a drive wheel 115 and said wheel engages with the surface of either cone 53 or 54 according to whether the carriage is on an angle of inclination or declination. Wheel 115 has fixed thereto a gear 116 meshing with gear 117 fixedly coaxial with an elongate spur gear 118. The gears 117, 118 are mounted for rotation in suitable bearings provided in the carriage 111.

When the carriage is on a level plane, the wheel 115 is at precisely the "zero" center point between the cones 53, 54 and should have, theoretically, no rotation. This, of course, is because the sine of a zero degree angle is 0.00 and it is necessary that no motion be transmitted to the chart stylus. As the angle of ascent or descent increases, the wheel 115 rides upon either the cone 53 or 54 until at a maximum angle of ninety degrees the appropriate cone is driving the wheel 115 at maximum rate.

To prevent any possibility of the wheel 115 overriding the end of a cone and hence being driven toward the axis of rotation thereof, guide rails 119R, 119L, are carried on the bed plate 51 for cooperation with a roller 120 on the carriage 111. The guide rails and roller perform functions similar to the rails 81, 82 previously described.

It is obvious that the travel of the stylus over the chart must be reversible so that the said chart may record ascending and descending paths of travel. Pursuant to the present invention the stylus drive is reversed by means of a clutch responsive to the angle of inclination.

Referring to Fig. 6, the carriage 111 is shown in its guided position in frame 110. The long spur gear 118 is shown in dotted line, and suitably journaled in a bracket 121 affixed to a frame 122 is a gear 123 in mesh with the gear 118 to be driven thereby. Gear 123 carries a bevel gear 124 which is in continuous mesh with idler gears 125, 126, suitably journaled. As shown in Figs. 4 and 6 the last-named gears carry clutch teeth, respectively 127, 128. A shaft 129 is suitably journaled in the frame 122 and is concentric with the idler gears 125, 126. Splined to said shaft is a clutch member 130 having opposed toothed surfaces for cooperation with the respective clutch teeth 127, 128 of the idler gears. A weight 131 is adjustably pivotally mounted on a bracket 132 fixed to the base plate 52, and said weight carries an arm 133 terminating in forked portion 134 (see Fig. 4) having inwardly extending pintles riding in the reduced diameter portion of clutch member 130. When the carriage is on a horizontal plane, the weight 131 is so balanced as to maintain the clutch 130 intermediate the clutch-tooth portions of the idler gears, whereas when the carriage ascends or descends, the tilting of the weight will bring one or the other of the toothed ends of clutch members 130 into engagement with the complementary teeth of the appropriate idler gear to drive the same. When the carriage tilts upwardly, for example, the arm 133 will rotate clockwise of Fig. 6, and the clutch will engage with the uppermost gear 125 and drive shaft 129 will be driven according to the rotation of said gear 125. As the carriage descends the clutch will engage with the lower gear 126 and the shaft 129 will be driven in reverse direction.

Oscillation of the weight 131 is dampened by such means as a friction roller 135 suitably journaled in support 132 and engaging with the arcuate lower periphery of the weight.

The respective shafts 109, 129 are journaled in water-tight glands 137, 138 equipped with means for removably affording driving connection between the said shafts and the flexible drives 30, 31, which are respectively the drives for the stylus carriage and the chart drive means.

*The chart mechanism*

The housing 29 for the chart mechanism preferably has a hinged, window-provided cover 140 through which the chart is visible. Within the housing is a rigid chart table 141 over which is passed a strip of chart paper 142 feeding from a roll 143 beneath guide rods 144 to a winder roll 145, the latter being carried on brackets 146 riding in trackways 147 under the urging of captive spring 148. The said springs 148 press the winder roll 145 frictionally against a drive roll 150 which extends substantially along the full length of the housing 29 and is suitably journaled therein.

Both the payoff roll and winding roll may readily be removed from their axles, as by some conventional releasable sockets 151. Handles, such as 152, 153 may be provided for manually rolling or unrolling the chart 142.

The horizontal component of travel of the carriage is converted, as previously explained, into a speed of rotation of shaft 108 and thereto connected flexible drive 31 which is proportional to the cosine of the angle of ascent or descent of the carriage. The flexible rotating shaft 31 drives a suitable gear change transmission 154 of any conventional design, from which the roller 150 is driven. The transmission 154 has means for suitably changing the gear ratio for varying the speed of rotation of roller 150. Such gear shift may be the handle 155 or equivalent. The purpose of the gear change mechanism is to make it possible for various chart scales to be used. Four changes of gear ratio are satisfactory to correspond to the four chart scales commonly used for horizontal distances in the United States and other English-speaking countries, to wit, one inch equals five feet, one inch equals ten feet, one inch equals fifty feet, and one inch equals one hundred feet.

The gear ratios of the transmission 154 will probably be one to one for the lowest chart scale, and all other gear ratios within the equipment will be so arranged that five feet of horizontal movement of the carriage will produce one inch of chart movement.

By having the drive of the chart mechanism by means of the roller 150 it is apparent that the drive ratio between the rollers 150 and 145 will automatically change as the roller 145 has a larger effective diameter by reason of the winding of paper thereon and hence there will always be a linearly uniform travel of the chart paper across the table.

Rods 160 are fixed to the housing 29 and are precisely parallel with the shafts of the chart rolls. Slidably mounted on said rods is a stylus carriage 161 at an end of which is a support for a stylus 162.

Within the housing 29 is a worm gear 163 driven by means of the flexible drive 30 through another gear-change transmission 164, the respective speed ratios of which may likewise be selected by the handle 165.

The available gear ratios provided by transmission 165 are appropriate for worm speeds for the accepted chart scales for vertical measurement, to wit, one inch equals five feet, one inch equals ten feet, one inch equals twenty feet, and one inch equals fifty feet.

Carried upon the underside of the carriage 161 is a half segment gear 166 which meshes with the worm gear 163. The gear segment 166 is at the end of the handle-provided post 167 and is continually urged against the worm 163 by means such as the spring 168. The purpose of the half segment gear 166 is to permit it to be lifted out of engagement with worm 163, so that the carriage 161 may be shifted longitudinally along the rods 160 to position the stylus 162 at any desired datum line on the chart.

Figures 7, 9:
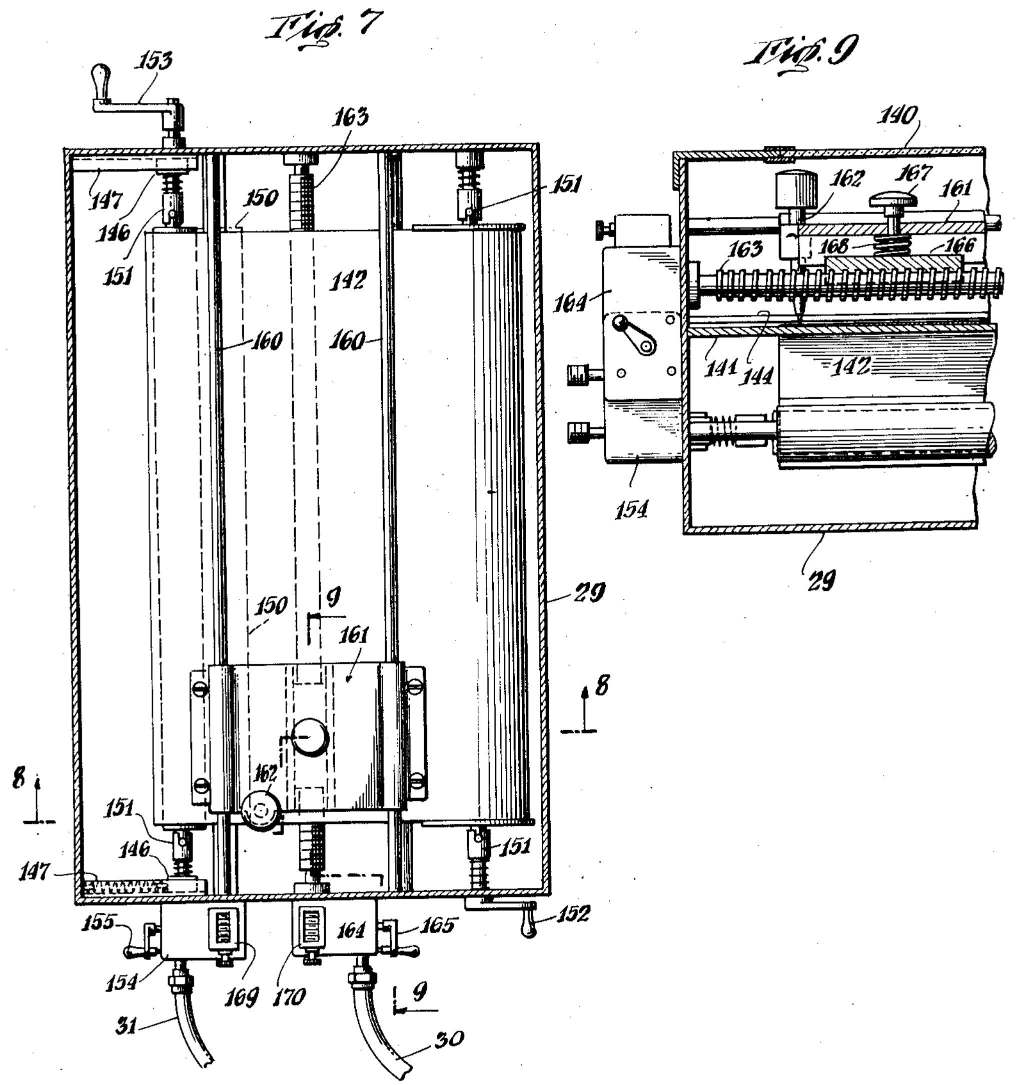
Fig. 7 is a plan view of the recorder section of the apparatus, the cover thereof having been removed to disclose the chart and stylus table.
Fig. 9 is a partial side elevation, in section, on lines 9—9 of Fig. 7.
Figure 8:
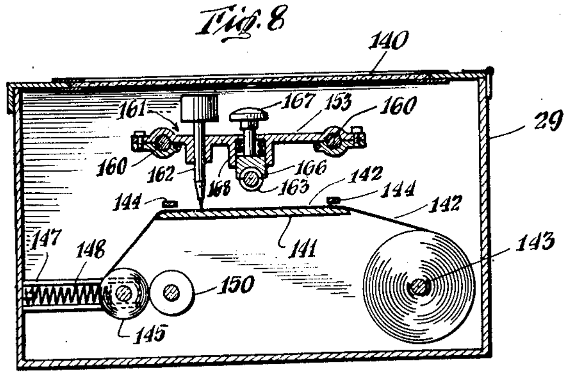
Fig. 8 is an end elevation, in section, on lines 8—8 of Fig. 7.

As shown in Figs. 7 and 8, the carriage is so arranged that it may be removed from the rods 160.

With the apparatus set up as previously described, and the stylus set at an initial point on the chart corresponding to 0.00 station and the known altitude of the starting station, the carriage is pushed or drawn along the line of survey. When the carriage is proceeding along an absolutely level stretch the chart 142 will be moving at maximum speed beneath the stylus, and since there will be no vertical component of carriage travel, the drive shaft 30, and hence the worm gear 163 will not be rotating; and there will be no movement of the carriage 161. Hence, during the extent of horizontal travel the chart will be inscribed with a horizontal line which will be truly representative of the actual distance traveled. As the terrain rises, the speed of chart movement will be less to conform to the horizontal projection of the angle of climb and the shaft 30 and worm 163 will rotate at a speed proportional to the sine of said angle of climb. Hence, the stylus carriage 161 will be moved along the trackways 160 upwardly of Fig. 7, and the resulting line inscribed by the stylus will be representative of the climbing angle. Conversely, when the carriage 20 is being moved down grade, the reversal of direction of drive 30 and worm 163 will reverse the direction of movement of the carriage 161 and the chart inscription will accordingly indicate the extent of angle of descent.

In Fig. 7, there are shown odometers or counters for indicating the true horizontal distance and the true vertical distance over which the carriage has travelled. The horizontal movement odometer 169 is disposed upon the gear box 154, and the vertical movement odometer 170 is similarly operatively associated with the gear box 164. By means of these odometers or counters, the surveying party is constantly kept apprised of the actual horizontal movement and the actual vertical movement traversed.

*Station marking*

It is conventional surveying procedure to successively mark stations at 100 ft. intervals along a straightaway, or stations intermediate the 100 ft. intervals at point at which the route deviates from the previous course. The present invention provides means for automatically marking the station locations by discharging a small amount of dye or other coloring fluid at each 100 ft. of true horizontal traversal. At such marks the surveying party can drive the conventional stakes and note on the chart the location of station positions.

Referring first to Fig. 5, there is mounted upon the housing 27 the ejector 35, which has a cylindrical housing within which is contained a piston 175 between the upper surface of which and the interior of the casing is a coil spring 176 of substantial strength. The upper portion 177 of the piston rod is operatively associated by means of a pin and slot connection, with arm 178 of a cut-off valve 179 which is disposed, see Fig. 1, in the conduit 34 from the reservoir 33. The valve 179 controls flow through the conduit 180 which enters the cylinder suitably above the bottom thereof. The outlet from the cylinder is controlled by a normally spring-closed ball check valve 181, to the outlet of which is attached the conduit 182 which in turn is supported by the carriage and terminates in a similarly normally closed spring valve (not shown) immediately above the discharge nozzle 183. The said nozzle 183 is in the vertical plane of the axle of the front wheel 21F.

Fig. 5 shows the position of the valve 179 in ejector filling position; in other words, the valve 179 is open, and assuming that the respective valves 36 and 37 are also open, the dye or like has entered the lower cylinder of the ejector 35 through the conduit 180. Means are provided to trip the piston 175, whereby the downward movement of the piston under the urging of spring 176 will cause a quantity of the fluid to pass through the normally closed valve 181, the conduit 182, and the normally closed valve at the nozzle 183 to eject a spurt of the fluid against the surface of the road or the like being traversed by the carriage. As the piston descends, the valve 179 is closed to prevent any of the coloring material from entering the ejector above the piston 175.

The automatic tripping means is associated with the shaft 104 in such manner that the trip is operated at precisely 100 ft. intervals of true horizontal travel. Fixed to the end of the shaft 104 for rotation therewith, and supported at its opposite end in a suitable bearing post 185, is worm 186 upon which is slidably mounted a traveller 187. Springs 188 normally urge the traveller to the right of Fig. 3. The traveller is automatically engaged with, or released from the convolutions of the worm 186 by means of a finger 190 slidably mounted in the hub portion of the traveller, as shown. The finger has a tip 191, the width of which is such as to fit snugly between the threads of the worm 186. The finger also has an upwardly extending lug 192 having parallel, sloping, surfaces for cooperation with the respective fixed cam members 193, 194, secured to and extending upwardly from the base 52 of the housing 27.

The finger 190 has formed in the side thereof two circular indentations 195, 196 for cooperation for a spring pressed ball detent 197 mounted in the hub of the traveller 187. In Fig. 3, the spring detent is shown as engaging with the uppermost indentation 195, and in such position it is seen that the tip 191 is held out of contact with the thread of the worm 186. Hence, the traveller 187 is free to be drawn to the right of Fig. 3 by reaction of the springs 188.

Suitably pivotally supported, as upon a post 198 extending downwardly from the underside of the ejector 35, is a trigger 199 which is normally urged to clockwise rotation by the spring 200. The trigger has a nose 201, the cam surface of which cooperates with a similarly sloping notch 202 in the lower portion 203 of the piston rod.

As is apparent from Fig. 3, the trigger 199 is L-shaped in plan section, and the branch 204 thereof is adjacent the cone drive shaft 46, above which is the piston rod portion 203.

A lower arm 205 of the trigger has an operating surface which bears against the side wall of a cam 206 slidably mounted on the shaft 46 in a slot 207, for rotation with said shaft. The cam is normally urged against the lower limb 205 of the trigger by a spring 208 which is relatively much weaker than the spring 200.

It will be apparent that with the apparatus in the Fig. 5 position, the cam 206 will be continually rotating; and as shown, the cam is immediately below, but out of engagement with, the piston rod 203.

Slidably supported within a post 210 fixed to base 52 is a rod 211, one end of which engages with the trigger 199 at a level beneath the pivot point thereof. The opposite end of rod 211 is in the path of a rigid arm 212 of the traveller 187.

In Fig. 3 it has been assumed that the traveller 187 has been driven to the left by reason of the engagement of the finger 191 between the threads of the worm 186 until at the end of 100 ft. of actual horizontal travel, the cam surface 192 of the finger 190 has engaged with the left cam 193, and the cam has drawn the finger outwardly to a position where the fingertip 191 is clear of the screw thread; the finger has attained a position wherein the detent 197 has engaged with the indentation 195 to hold the finger and its associated tip out of engagement with the worm. Hence, there is nothing to restrain the action of the springs 188, which sharply move the traveller 187 along the cylindrical outer surface of the worm 186 until the arm 212 strikes the end of the rod 211 driving said rod sharply to the right. As the rod moves to the right, the trigger 199 is moved counterclockwise of Fig. 5 and the nose 201 of the trigger rotates away from the upper surface of the notch in the lower end of piston rod 203. Simultaneously as the lower member 205 of the trigger follows the path of motion, the spring 208 urges the cam 206 to the right, thereby removing it from the path of action of the piston rod 203, which descends under the urging of the spring 176 and permits the piston 175 to discharge fluid from the cylinder as previously explained.

At the end of travel of the traveller 187, the cam surface 192 of the finger 190 strikes the sloping surface of the cam 194 and the finger is urged forwardly to a position where its tip again enters between the threads of the worm 186, it being locked in position by the spring detent 187 which then engages with the indentation 196. The traveller 187 then again begins to travel to the left of Fig. 3, and as the arm 212 moves out of engagement with the rod 211, the spring 200 rotates the trigger 199 clockwise. The lower portion 205 of the trigger moves the cam 206 to the left of Fig. 5 until it again is in position beneath the rod 203. It will be understood that at such point, a low area of cam 206 is beneath the rod 203 and out of engagement therewith so that said rod does not restrain movement of the cam. As the cam continues to revolve, its high point engages the rod 203 and lifts it against the spring 176 to a point wherein the nose 201 of the trigger engages the upper surface of the notch 202 to hold the rod in raised position, in which position the lower end of rod 203 is sufficiently above the cam to permit free rotation thereof.

The traveller 187 continues its leftward travel until at the end of 100 ft. of true horizontal movement, its finger 190 is again tripped and the traveller drawn to the right to repeat the operation of the ejector, to mark another station.

*Mechanism for recording or indicating horizontal alignment of distances traversing in any plane*

Figures 10, 11, 12:
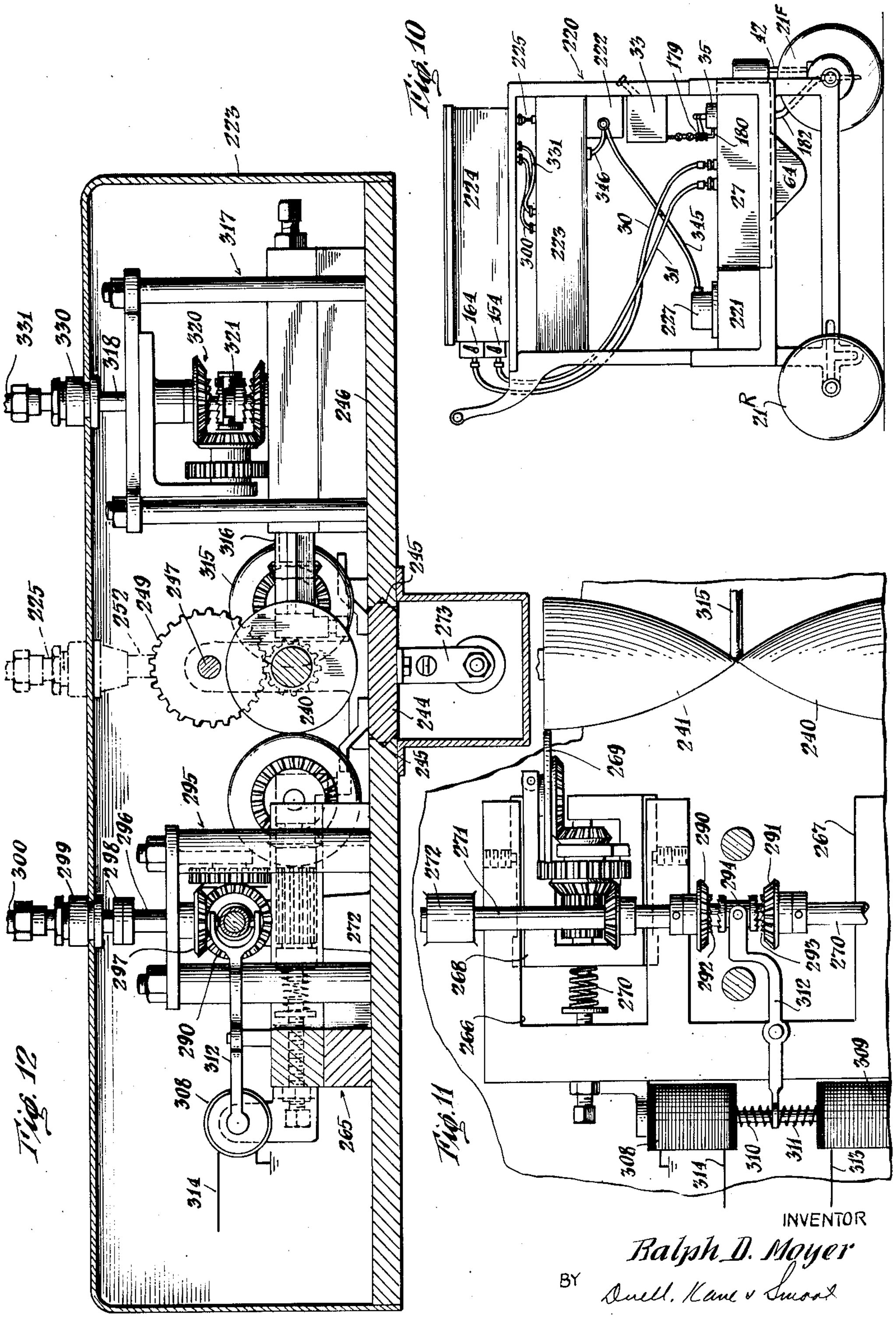
Fig. 10 is a side elevation of a carriage having mounted therein a second embodiment of the invention incorporating profile and mapping calculators and recorders.
Fig. 11 is a partial plan view of the proportional-speed mechanism used for the mapping of routes traversed by the carriage.
Fig. 12 is an end elevation, specifically of the proportional-speed mechanism of the route mapping portion of the embodiment of Fig. 10, it being understood that a similar proportional-speed mechanism may be used in connection with the embodiment of Fig. 1.

In a second embodiment of the invention, Fig. 10 illustrates a carriage 220 equipped, in addition to the profile-plotting mechanism and station marking mechanism previously described, with apparatus for recording the direction of travel of the carriage. The profile-plotting apparatus is essentially the same, and hence all elements of the carriage 220 which are in common with the previously described carriage 20 have been given identical reference numbers. In the carriage 220 however the profile-plotting differential speed housing 27 has been moved forwardly to permit a gyrocompass unit housing 221 to be positioned on the lower carriage chassis, and the reservoir 33 has been moved downwardly to permit a storage battery 222 to be mounted thereabove. The proportional speed mechanism for the mapping portion is contained in a housing 223 immediately beneath a modified chart housing 224 and is connected therewith by three preferably flexible drive shafts, as later explained.

Figure 13:
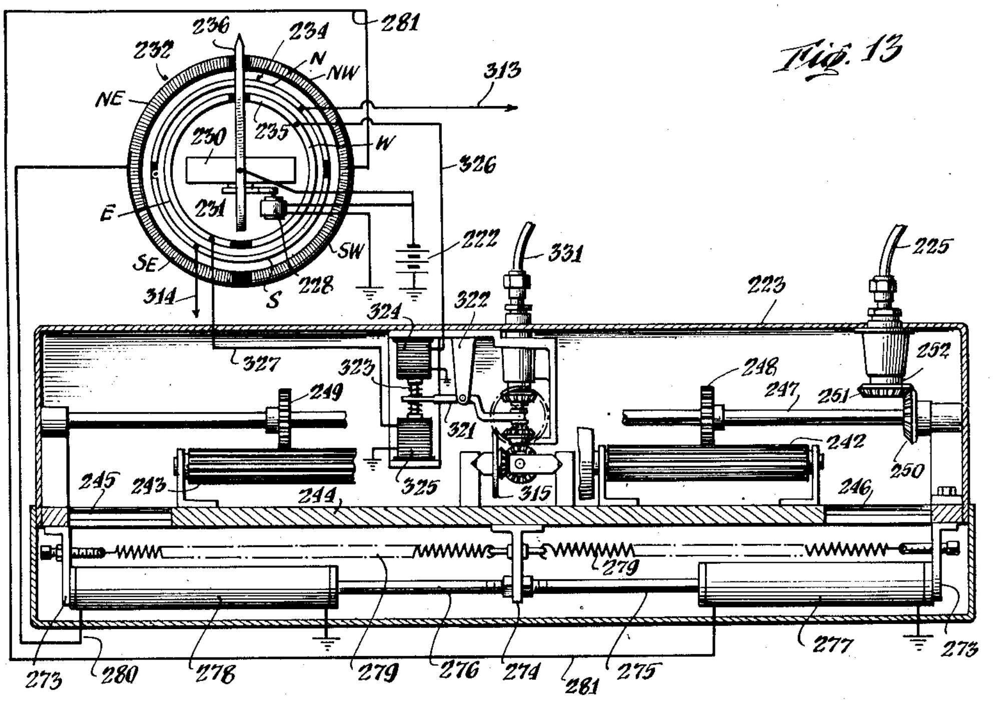
Fig. 13 is a partial side elevational view of the proportional-speed mechanism of the route-mapping section, with the gyroscope shown somewhat schematically.

In service, it is obvious that the apparatus will traverse routes that will be hilly and curving, and in order properly to map the route, the horizontal projections of the actual slopes must be continuously derived, and the directional components of an angular course must also be determined. Sine-cosine cones are employed to break the course down with its directional components and such cones are driven from the chart-drive roll of the profile recorder. Hence, the cones revolve at a speed which is always indicative of the horizontal component of the travel of the carriage 220. True north is established by means of a conventional gyrocompass connected to and driven from the storage battery 222. Fig. 13 somewhat schematically shows the gyrocompass, in which the electric motor 228 and gyro wheel 230 are mounted on a turn table 231 supported on anti-friction bearings (not shown). Within the housing 221 are a rheostat 232 and directional contact rings 234 and 235, which may be set as desired with respect to the north-south axis of the gyrowheel. Thus it is possible to establish any desired reference meridian. It will be understood that the gyrocompass assembly and housing 221 are completely water-tight to permit the carriage 220 to be transported across the under-water line of survey. As is well known, the gyrocompass will effectively resist any deviation from its established north-south axis of rotation, and hence the position of the rheostat 232 and the respective contact rings will change with respect to a contact brush 236 insulatedly carried by the gyro turntable 231, as the carriage deviates to the right or left of the established meridian. This action is much the same as that of a boat with respect to its compass. Although the compass card appears to swing, it is actually the boat which revolves about the compass card.

The gyrocompass, rheostat, and the contact rings are used to effect changes in direction and speed of movement of a recorder chart, and direction and speeds of movement of a stylus carriage associated therewith, all as later explained.

Within the chamber 223 are supported, see Fig. 11, a pair of sine-cosine cones 240, 241 carried on shaft extensions of gears 242, 243 mounted on a bed plate 244 slidably supported within trackways 245 formed in the base plate 246 of the housing 223. Extending axially above said gears and journaled in suitable bearings, is a shaft 247 fixed to which are the respective gears 248, 249 which mesh respectively with the elongate gears 242, 243. One end of shaft 247 has fixed thereto a bevel gear 250 in mesh with a mating gear 251 fixed to the end of a stub shaft 252 which extends upwardly through a gland in the upper part of housing 223, where connection is made to preferably flexible shaft 225.

Figures 14, 15:
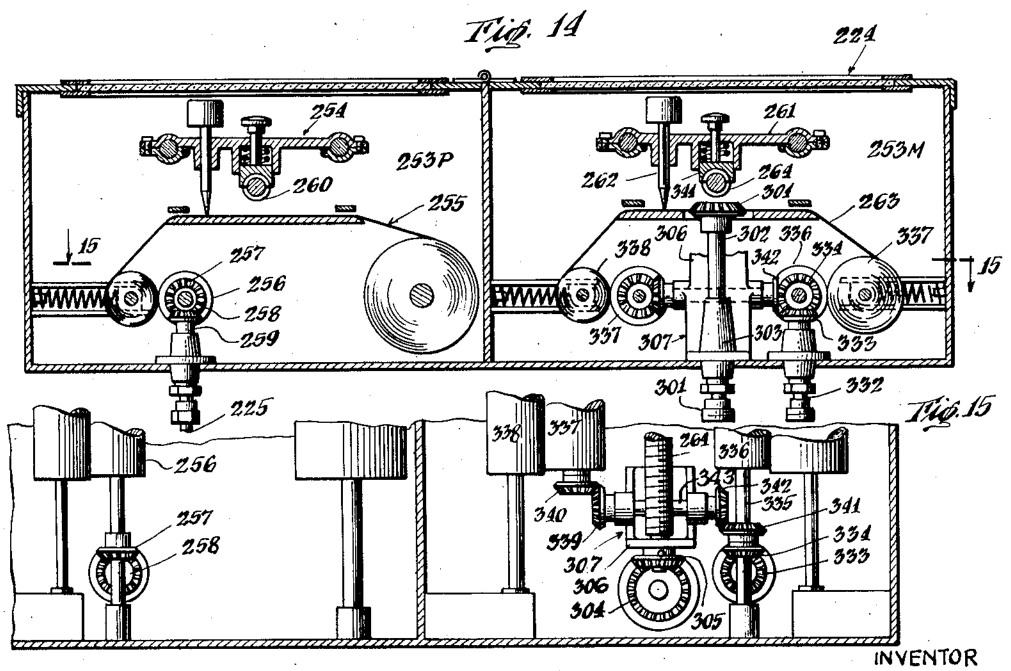
Fig. 14 is a schematic end elevation of the respective profile recording and map recording elements of the embodiment of Fig. 10.
Fig. 15 is a partial plan view of the roller drive gearing of the profile recording and map recording structures.

Referring now to Fig. 14, the chart housing 224 is divided into two sections, in one of which 253P, there is located a profile-plotting chart and therewith associated equipment for the illustrated stylus carriage 254 and chart 255 which are driven by the cables 30, 31, through gear boxes 164, 154, as previously explained in the earlier embodiment. The other section, 253M, contains the chart, stylus carriage and associated drive equipment for mapping. The profile-chart drive roll 256 is provided with a bevel gear 257 which meshes with a cooperating gear 258 fixed to the one end of a shaft 259 which extends downwardly through a gland at the bottom of the housing and connects with the other end of shaft 225. It will be understood that chart drive roll 256 and the stylus carriage worm 260 are driven from the proportional speed cone drive in the housing 27, as previously explained in the first embodiment. For simplification, the drive means from housing 27 to the chart roll and stylus worm have been eliminated from Figs. 14 and 15. It may be assumed that such drive means are at the opposite ends of housing section 253P. Shafts 259, 225, 252, 247, and hence the cones 240, 241 are thereby driven at speeds which correspond to the speed of true horizontal movement of the carriage 220, regardless of the slope of the terrain over which the apparatus is moving.

In the mapping section 253M means are provided to move the stylus carriage 261 and its associated stylus 262 lengthwise of the chart table, for north and south travel of the apparatus. This is accomplished by rotation of the worm 264 in one or the other direction by a reversible drive later explained. Means are provided to move the chart in either direction beneath the stylus, for east-west movement of the apparatus.

The drive means for the stylus carriage comprises a proportional speed mechanism which includes a frame 265 mounted on the base plate 246 and having a pair of trackways or guides, one of which, 266, is shown fully in Fig. 11. But a portion of the other, 267, is shown. Said trackways correspond to the similar frame and trackway organization 70, of Fig. 3. Each of said trackways slidably supports a carriage, such as 268, at one end of which is a drive wheel 269 engaging with the adjacent sine cosine cone 241. It will be understood that a second carriage (not shown) carries a drive wheel for cooperation with the second cone 240. A spring 270 urges the carriage 268 in the direction of the cone, and stop means, guide rails, and the like are provided as previously explained with respect to Fig. 3. By spur and bevel gearing as shown in Fig. 11, the rotation of wheel 269 is transmitted to the horizontally disposed shaft 271 supported in posts 272. It will be understood that a second organization of gearing connects the counterpart of wheel 269 to shaft 271 and hence said shaft is also driven by rotation of the said counterpart of wheel 269 when said wheel engages with the cone 240.

Movement of the cones relative to the wheel 269 and its counterpart is accomplished, in the present instance, by solenoid organization mounted on suitable brackets 273 which are fixed to the base plate 246 in the line of the center axis of the bed plate 244. A bracket 274 extending downwardly from the center point of the bed plate adjustably carries oppositely extending soft iron cores 275, 276 which extend freely into the respective solenoid coils 277, 278. A pair of equal-tension springs 279 connect from the bracket 274 to the respective coil supporting brackets 273. With the solenoid coils deenergized, the springs position the bed plate 244 so that the drive wheel 269 and its counterpart are at the extreme ends of the cones; in other words, the cones are centered with respect to the drive wheels.

The solenoids are deenergized so long as the carriage is travelling in a true north or south direction, for in such direction of travel it is obvious that the stylus carriage 261 should be moving at maximum speed with respect to the chart 263.

Referring now to Fig. 13, it is seen that the rheostat 232 is divided into four quadrants, respectively designated NE, SW, SE, NW, with insulation between the quadrants NE, NW, and SE, SW. As is shown from the circuit diagram of Fig. 13, the brush 236, when the carriage is progressing due north, occupies one of the insulation spaces between the NE and NW rheostat segment and hence no current will flow to either solenoid. As the carriage is moved in an easterly direction, the rheostat, fixed to the carriage, will move clockwise with respect to the brush 236, and the brush will contact to the NE portion of the rheostat, to an amount which depends upon the extent of deviation from north. Current will then flow from the battery 222 through the brush and rheostat quadrant NE, through conductor 280 to solenoid 278 to ground. The solenoid will be energized to an extent depending upon the effective resistance of the NE quadrant and will attract its core 276 moving the sub-base and associated cones to the left of Fig. 13. The cone 241 will be the effective drive cone and drive wheel 269 will take up a position along its surface which is equal to the amount of movement of the sub-base. Drive wheel 269 will rotate at a slower speed because it engages with a reduced-diameter portion of the cone and will slow the travel of the stylus carriage, as later explained.

For due easterly travel, the brush 236 will bridge the respective rheostat quadrants NE and SE and full power would be transmitted to rheostat 278. The sub-base and associated cones will be moved to their extreme position until the drive wheel 269 is positioned at the apex of cone 241 and the wheel, theoretically, will have no rotation. As the carriage proceeds in a more southerly direction, the resistance of the SE quadrant increases, decreasing the power of solenoid 278, and permitting the springs 279 to reverse the direction of movement of the cones until, at due south, the wheel 269 would again be at the point of maximum diameter of cone 241.

Similarly, if the carriage took a course to the west of north, a portion of rheostat NW would contact the brush 236, and current would flow through conductor 281 to solenoid 277, shifting the sub-base and thereon mounted cones in the opposite direction wherein cone 240 would drive the counterpart of wheel 269.

The power of solenoid 277 is similarly increased until at due west, the solenoid has maximum power and the said drive wheel is at the apex of cone 240. Proceeding from due west to south, the power of solenoid 277 is progressively less, until, at due south, neither solenoid would be energized and the respective drive wheels would again have maximum speed of rotation.

Shaft 271, as previously explained, is driven by either drive wheel through the gear train. The shaft mounts idler gears 290, 291, each of which has a clutch tooth portion, respectively 292, 293. Splined on the shaft 271 is a clutch 294, the teeth of which may engage with the teeth on either gear 290 or 291. A frame 295 fixed to the base plate 248 rotatably supports a shaft 296 having a bevel gear 297 which is in continuous mesh with the respective gears 290, 291. The shaft 296, as well as all shafts passing through the upper wall of the housing, may have a coupling 298. The shaft extends through a gland 299, and couples to a drive shaft 300 which at its opposite end connects to the gland nut 301 beneath housing 253M. Shaft 302 extending through the gland 303 and thereby driven by shaft 300, has a bevel gear 304 meshing with a gear 305 fixed to the end of worm 264. Said worm 264 may be journaled in a vertical wall 306 of a bearing bracket 307.

The stylus carriage may be assumed to proceed vertically up the chart for northerly directions of travel of the carriage, and in reverse directions for southerly directions of travel. The reversal of rotation of direction of movement of the shaft 302, and hence of the worm 264 is accomplished by shifting the clutch 294 to engage with either of the idler gears 290 or 291.

The shift of the clutch is accomplished by means of solenoids 308, 309, the armatures or cores of which are normally held in neutral position by the springs 310, 311. At the middle point of the armatures there is affixed a pivoted clutch shaft lever 312 the forked end of which rides in the peripheral groove of clutch 294, as appears in Fig. 12.

Contact ring 234 is divided into two mutually insulated, semicircular segments, respectively designated N and S. A conductor 313 connects the N segment with the solenoid 309, whereas conductor 314 connects the S segment with solenoid 308. Hence, with the carriage travelling in a northerly direction, i. e., in any direction northerly of due east or due west, the brush 236 is in contact with the N segment and battery power is transmitted to solenoid 309, energizing the solenoid and throwing the clutch so that the shaft 296 rotates the worm 264 in a direction which will cause the stylus carriage to travel up the chart.

Conversely, for any southerly direction of travel, the S segment is engaged by the brush 236 to energize the solenoid 308 and throw the clutch for a reverse direction of the worm 264.

The single wheel 315, carried upon the slidable carriage 316 supported in frame 317, has operating characteristics identical with those previously described with respect to the wheel 115, its operating carriage 110, and its illustrated clutch mechanism, as shown on Fig. 4. The wheel 315 engages with and is driven by either cone 240 or 241 for the purpose of recording the east-west components of travel of the carriage. As previously explained, the solenoids 277, 278 are independently energized according to whether the carriage is moving in an easterly or westerly course, and depending upon the course, the wheel 315 engages with either of the cones. The clutch assembly and gearing for translating the rotation of the wheel 315 into one or another direction of rotation of the shaft 318, is almost precisely as previously described in the discussion of the Fig. 4 embodiment, and the clutch assembly, and gearing, in its entirety has been designated 320. In the present embodiment, however, the clutch is thrown electromagnetically and therefore the clutch shift lever 321 is pivoted to a post 322 and is secured to the midpoint of spring balanced solenoid cores 323 (Fig. 13) which cooperates with the respective suitably supported solenoids 324, 325.

As clearly appears in Fig. 13, the coil 324 is connected by means of conductor 326 to the westerly segment W of the contact ring 235, whereas the coil 325 connects through conductor 327 to the segment E of the said ring. Hence, as the carriage proceeds in an easterly direction, the entire assembly of the rheostat 232 and the respective contact rings will rotate clockwise relatively to the fixed position of brush 236, and current will flow from the battery through brush 236, and E segment, then through conductor 327 to energize solenoid 325. This will pull the solenoid core downwardly and will rotate the clutch lever 321 counterclockwise and the clutch member will engage the uppermost idler of the clutch assembly 320 and will correspondingly rotate the shaft 318.

The shaft 318 passes through a gland 330 to a fitting which provides for connection to a shaft 331 which connects, at its opposite end, to the stub shaft 332 extending through the illustrated gland in the base of the housing section 253M. By the illustrated bevel gearing 333, 334, the rotation of shaft 332 is transmitted to the drive shaft 335 of chart drive roll 336 frictionally engaging chart roll 337. A second chart drive roll, 338, is provided and is driven from the same shaft 332 through a second assembly of bevel gearing, 339, 340. Said gearing is driven from gearing 341, 342 at one end of shaft 343 supported in bracket 307, as clearly appears in Figs. 14 and 15. The purpose of the second drive roll 337 is to afford means whereby the direction of movement of the chart 263 beneath the stylus 262 may be reversed as the course of the carriage changes from easterly to westerly. As the course changes to westerly it will be obvious that the W segment of the ring 235 will energize the solenoid 324, rotating the clutch lever 321 clockwise of Fig. 13 so that an opposite direction of movement of shaft 318 will result, with a reverse movement of travel of chart 263 beneath the stylus.

In the foregoing description, it has been assumed that the gyroscope has been set so that the brush 236 points to geographical north. Hence, the stylus carriages travels vertically up and down the chart for northerly and southerly courses taken by the apparatus. It is apparent that for a long northerly or southerly course, the stylus would come to the ends of the chart and would have to be reset as by raising the stylus carriage gear segment 344 out of engagement with the worm 264 and shifting the carriage 261 to a new position on the chart.

For long northerly or southerly courses, the chart will therefore show a succession of substantially vertical lines spaced along the chart. Therefore, when the line to be surveyed or mapped is predominantly northerly or southerly, it may be preferable to set the axis of rotation of the gyroscope so that the brush 236 points geographically easterly or westerly, whereupon the chart 263, and not the stylus carriage, record the north-south directions of travel. Hence, the stylus will not have to be reset until the entire length of the chart paper roll has been unwound.

The apparatus of the second embodiment also provides for submarine surveys through the expedient of separating the carriage 220 and increasing the lengths of electric cable 345 from gyro to battery 222 and the lengths of flexible cable 30, 31 connecting the proportional speed housing to the profile-plotting housing 224. The short length of cable 346 from the battery to housing 223, as well as the respective flexible-shaft drives 225, 300 and 331 need not be changed because these elements are all located above the point of separation of the carriage 220.

It will be understood, of course, that the cables 345, 346 are multiple-conductor cables, containing all conductors necessary for the gyroscope and solenoid lead wires.

Figures 16, 17, 18, 19, 20:
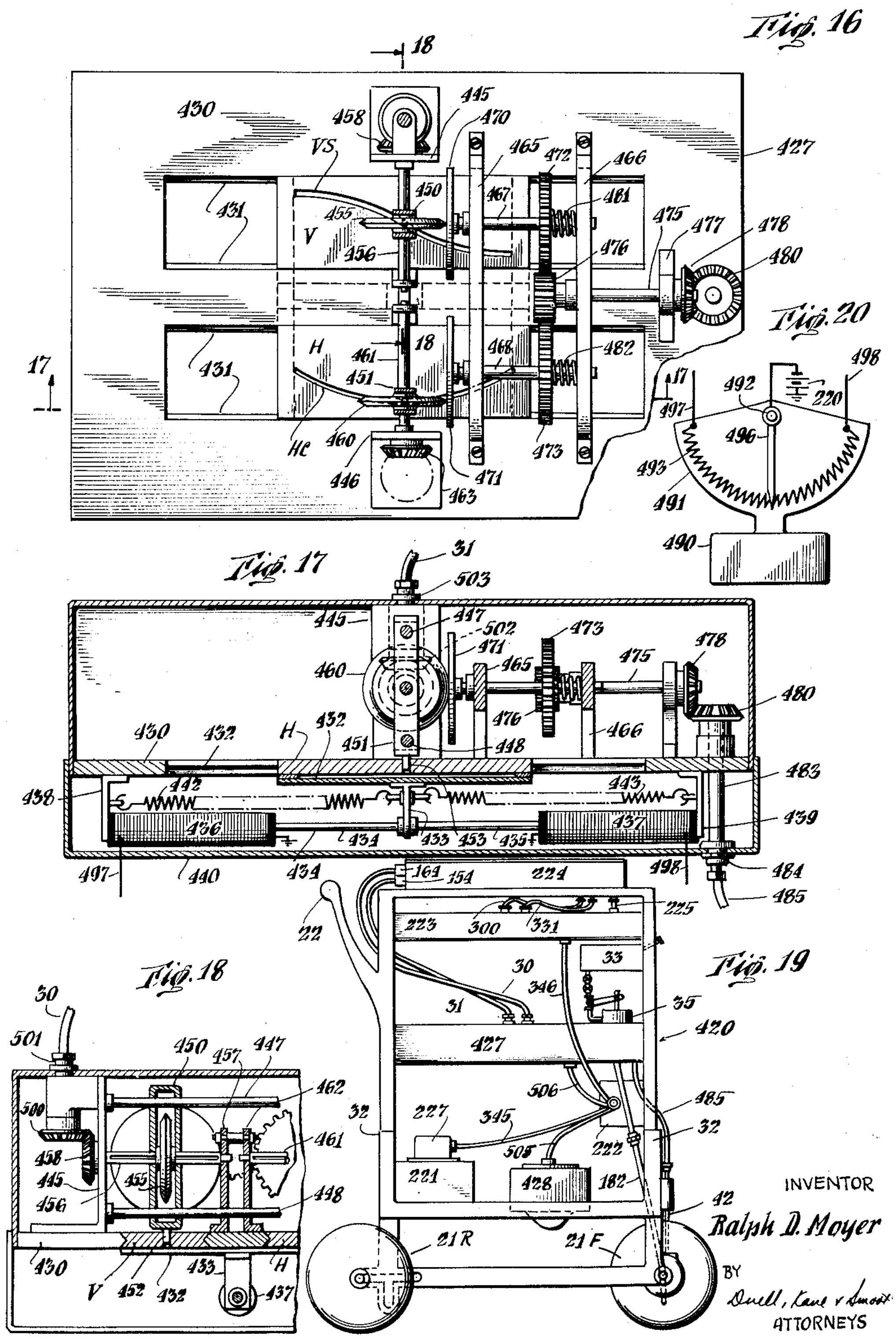
Fig. 16 is a plan view of a second form of trigonometric proportional-speed mechanism, which may be used alternatively with the cross sectioning or mapping mechanism of the invention.
Fig. 17 is a vertical section taken on lines 17—17 of Fig. 16.
Fig. 18 is an elevational detail taken on lines 18—18 of Fig. 16.
Fig. 19 is a side elevation of a vehicle embodying cross sectioning and route mapping devices, and embodying the Fig. 16 form of proportional-speed mechanism.
Fig. 20 is a somewhat schematic detail of the plumb weight and resistor structure by means of which the cam plates of Fig. 16 are shifted according to the ascent or descent of the vehicle.

Figs. 16 through 20 show another embodiment of the invention, utilizing cam track means in lieu of sine-cosine cones for effecting the trigonometric proportional-speed drive. Fig. 19 shows a carriage equipped with the cross-sectioning and mapping apparatus as previously described with respect to Figs. 10 through 15, and as such, all apparatus in common with Figs. 10 through 15 have been given identical reference characters. The modified carriage 420, Fig. 19, is equipped with a superstructure assembly which may be separated from the lower chassis assembly, as at the demountable joints 22.

The apparatus of Fig. 19 has, in lieu of the water-tight chamber 27 of Fig. 10, a modified chamber 427 located in the upper superstructure portion of the carriage, and in lieu of the plumb weight and rack means of shifting the sine-cosine cones as shown in Fig. 5, the vehicle 420 has, within a water-tight chamber 428 on the lower chassis portion, a plumb weight organization which actuates a resistance and contact plate, as presently described.

Referring now to Fig. 16, the base plate 430 of chamber 427 is provided with a pair of spaced parallel trackways 431, 431 within which are slidably mounted cam plates V and H which are tied together by a cross member 432 for conjoint sliding motion in the direction of travel of the vehicle 420. Extending downwardly from the geometric center of plate 432 so that it will be in line with the transverse center lines of plates V and H, is a bracket 433, fixed to which are the cores 434, 435, of the respective solenoids 436, 437 fixedly supported in brackets 438, 439 secured to and extending downwardly from the base 430. A water-tight housing 440 encloses the solenoid assembly. Springs 442, 443, of equal strength, are fixed at one end to the respective brackets 438, 439, and at their opposite end to the bracket 433. The springs are so tensioned that with equal power in both solenoids, the bracket 433, and hence the respective plates V and H, will be on center.

Plate V has a cam track VS which represents a sine curve over the angular range of from 90 degrees to 270 degrees, whereas plate H has a cam track HC which represents a cosine curve over the angular range of from 90 to 270 degrees.

A pair of brackets 445, 446 fixed to plate 430 at opposite sides of the plates V and H support parallel guide rails 447, 448, which are in a vertical plane passing through the midpoint of the respective cam tracks when the carriage, and hence the chamber 427, is on a horizontal plane. Arranged to ride along said guide rails are a pair of sliding frames 450, 451 which respectively have pins 452, 453 which ride within the respective cam tracks VS and HC.

Disposed within the frame 450 is a wheel 455, splined to a shaft 456, one end of which is journaled in a bracket 457, and the opposite end of which extends through bracket 445 and has mounted thereon a bevel gear 458. The shaft 456 is in the plane which passes through the centers of the guide rails 447 and 448.

Similarly, the frame 451 rotatably carries a wheel 460, the splined shaft 461 of which is journaled at one end in a bracket 462 and at the opposite end in the bracket 446; said shaft 461 terminates in a bevel gear 463. Shaft 461 is likewise in the vertical plane of the guide rails 447 and 448.

A pair of bridge members 465, 466 which are supported upon the plate 430 and straddle the respective plates V and H as shown in Fig. 16 rotatably mount shafts 467, 468 which are in the longitudinal center line of the respective plates V and H. Projecting forwardly from the bridge 465, and fixed to the ends of shafts 467, 468, are plane surfaced wheels 470, 471 which are respectively in contact with the wheels 455 and 460. Shaft 467 has fixed thereto a gear 472 and shaft 468 has a precisely similar gear 473. The bridge 466 supports one end of shaft 475 which carries a gear 476 in continuous mesh with the respective gears 472, 473. The opposite end of shaft 475 is journaled within a bracket 477, and carries a bevel gear 478 in mesh with a second gear 480. The respective shafts 467 and 468 are slidably journaled in the respective bridge members, and are urged in the direction of the wheels 455 and 460, as by the coil springs 481, 482.

As shown in Fig. 17, the gear 480 is at an end of a suitably journaled shaft 483 which passes through a gland 484 to connect with a flexible drive cable 485. Said cable 485 connects with and is rotated by the shaft 42 which in turn is operatively associated by suitable gearing with the wheel 21F for rotation as the carriage traverses the route to be surveyed.

It will be seen therefore that as the carriage is propelled along the line of survey, the flexible shaft 485 will, through the gearing 480, 478, rotate shaft 475 and, through the illustrated gear train will cause the shafts 467, 468 and their associated wheels 470, 471 to rotate. The wheel 455 is in contact with the wheel 470 and so long as the said wheel is not at the precise center of wheel 470, rotation of the latter wheel will cause wheel 455 to rotate. Similarly, so long as wheel 460 is not at the precise center of rotation of wheel 471, the latter wheel will cause wheel 460 to rotate.

It will be understood that the points of contact of wheels 455 and 460 with their associated driving wheels 470 and 471 are along a line which passes through the centers of rotation of said driving wheels.

It is apparent that as the cam plates V and H are moved to the left or right of Fig. 16, the frames 450 and 451 will shift the wheels 455 and 460 over the surface of the respective drive wheels 470 and 471, and the wheels 455 and 460 will have a speed of rotation proportional to the distance which the said wheels are from the centers of rotation of their driving wheels. Inasmuch as the respective cam tracks represent trigonometric functions, the speeds of rotation of the wheels 455 and 460 will be proportional to the trigonometric functions represented by the position of the respective cam plates. When the vehicle is traversing a horizontal plane, it is apparent that the wheel 455, representing the vertical component of movement of the vehicle, should have no rotation, whereas the wheel 460, representing the horizontal component of travel of the vehicle should have maximum speed of rotation.

The movement of the respective cam plates V and H according to the angle of inclination or declination of the vehicle 420 is effected by regulation of the power input to either of the solenoids 436 or 437. Such regulation is by means of a plumb weight 490 having affixed thereto a segment 491, which is of insulation material, or faced with insulation material. The plumb weight and segment are pivotally suspended from a shaft 492 extending transversely of the direction of movement of the vehicle, the said plumb weight and its associated segment being contained within the chamber 428 on the lower chassis section of the vehicle. The insulating segment 491 carries a rheostat 493. A brush 496 is fixed so that with the vehicle on a horizontal plane it is at the mid-resistance point of the rheostat 493. As the carriage traverses an ascending slope, the left hand portion of the resistance 493 will engage with the grounded brush 496. Considering initially the effect of the change in effective resistance of rheostat 493, it would be noted that the lead 497, connects to the solenoid 436 and the lead 498 connects to the solenoid 437. With the carriage on a horizontal plane, the same amount of voltage flows from the battery 220 to each solenoid, and the bracket 433 is therefore held at midposition. As the vehicle enters on the ascending slope and the left hand portion of rheostat 493 contacts the brush 496, there will be less resistance in the circuit to solenoid 436 and more in the circuit to solenoid 437; hence solenoid 436 will exert a net pull on the cores 434 and 435 which will cause the bracket 433 to shift to the left on Fig. 17, and hence move the plates V and H to the left of Fig. 16. Cam track HC will, through the frame 451, move the wheel 460 toward the center of wheel 471, and hence, said wheel 460 will have a slower speed of rotation. The movement of plate V, however, will cause the cam track, acting through the frame 450, to shift the wheel 455 away from the center of drive wheel 470, i. e., downwardly as viewed in Fig. 16 to an amount equal to the natural sine of the angle of ascent, and hence the wheel 455 will be driven by wheel 470 at a speed which is proportional to said natural sine.

Similarly, if the vehicle were to enter on a descending slope, solenoid 437 would receive more power than solenoid 436, and the cam plates would be drawn to the right of Fig. 16. Slot HC would cause wheel 460 to be moved toward the center of wheel 471, and cam slot VS would cause the wheel 455 to be moved upwardly of Fig. 16 to assume a new position across the center of wheel 470 in proportion to the extent of angle of descent of the carriage. It is obvious that as wheel 455 travels beyond the center of wheel 470, it, and its shaft 456, will have an opposite direction of rotation.

The gear 458 rotated by shaft 456 meshes with a gear 500 suitably supported on the bracket 445, and driving the flexible shaft 30 through the water-tight gland 501. The shaft 30 connects, as in the previous embodiments, to the stylus carriage drive worm of the cross section chart portion of the apparatus. It will be understood that the flexible shaft 30 drives said stylus carriage worm through the gear change mechanism 164 as previously described.

Gear 463 meshes with and drives a gear 502 suitably supported in the bracket 446, and connected through the water-tight gland 503 with the flexible drive cable 31 which, as in the previously described embodiments, motivates the chart drive means of the cross section chart portion of the apparatus, said drive being through the gear change mechanism 154 shown in Fig. 19.

It is apparent that the cam plates H and V with their trigonometric cam slots, may be utilized wherever the sine-cosine cones have been shown in the previous embodiments. For example, in the embodiments of Figs. 10 through 15, the sine-cosine cones 241 and 240, which are driven from the chart drive mechanism and the profile plotting or cross-sectioning portion of the machine, may be replaced by the assembly illustrated in Figs. 16 and 17, the drive of the gear 476 thereof being from the cross-section chart drive mechanism.

It will be noted that it is not necessary to have a reversing clutch in the drive 30 for the reason that the wheel 455 automatically reverses its direction of rotation as it passes from one side to the other of the center of wheel 470 corresponding to a shift from an ascending to descending path of travel of the vehicle.

The embodiment last described has a practical advantage over the previous embodiment in that the major part of the proportional-speed and plotting mechanisms are located on the demountable superstructure portion of the vehicle. The lower chassis portion contains only relatively compact and easily sealed apparatus, and the only elements which require alteration as the vehicle is separated to permit an under-water survey are the electrical cables 345 and 505 which connect the battery with the electrical apparatus of the last-described embodiment. It will be understood that the station-marking conduit 182 must be broken and plugged when under-water surveys are to be made, and that the flexible cable 485 must be appropriately lengthened. When heavy conductors are used in the respective cables, the difference in the conductor resistance for changes in cable length up to 100 ft. will probably be so negligible that the operation of the various electrical devices will not be noticeably affected. For longer cable lengths, or for cables employing smaller gauge conductors, it may be necessary to equip the apparatus with an adjustable resistance so that under all conditions of use, the increasing or decreasing cable lengths may be compensated to provide an approximately uniform total resistance.

Although the invention has been described by making a fully detailed reference to the certain presently preferred embodiments, such detail of description is to be understood in an instructive rather than a limiting sense, many changes being possible within the scope of the claims hereto appended.

I claim:

1. Apparatus for recording true horizontal distances and true vertical departure from a predetermined horizontal plane, comprising a vehicle adapted to be propelled over a surface and having at least one rotatable ground contacting member of known circumference, a chart table in said vehicle occupying a fixed position, a recording sheet movable across said chart table, a drive roller connected to said rotatable member for moving said recording sheet, a stylus carriage provided with a stylus for inscribing said recording sheet, torque means for driving said stylus carriage relative to said chart and said recording sheet to record the contour of said departure from a predetermined horizontal plane, a pair of rotatable cones driven from said rotatable ground contacting member, the surfaces of said cones affording an infinite number of effective driving diameters over a predetermined sine, cosine range of angular departure of said vehicle from the predetermined horizontal plane a pair of friction wheels engaging with and driven by the surface of the cones for driving the chart, a third friction wheel for driving the stylus engageable with and adapted to be driven by the surface of either of the cones, the point of engagement of the third friction wheel being spaced 90° on the sine curve from the points of engagement of the two first mentioned friction wheels, a pendulum means axially shifting the cones relative to the friction wheels in one direction or the other in proportion to the angle of ascent or descent of the vehicle so that the chart and stylus are driven by said friction wheels at speeds which are proportional respectively to the cosine and sine of the angle of ascent or descent.

2. Apparatus as claimed in claim 1 in which the cones are mounted in apex-to-apex relationship and the third friction wheel is mounted between the two first mentioned friction wheels.

3. Apparatus as claimed in claim 1 in which a stationary cam guard is attached adjacent each cone, a carriage associated with each of the first mentioned pair of friction wheels, and a cam follower mounted on each said friction wheel carriage engageable with the cam guard for the respective cone, whereby the respective friction wheel is movable in and out of engagement with its respective cone.

4. Apparatus as claimed 1 in which the recording sheet is wound on a winding roll, a driving roller contacting the periphery of the recording sheet wound on said winding roll, and means actuating said driving roller to move said recording sheet with relation to the stylus carriage whereby the ratio between said driving roller and winding roller automatically changes to provide a linearly uniform travel of the recording sheet with respect to the stylus carriage.

5. Apparatus for recording true vertical and horizontal distances and true vertical departure from a predetermined horizontal plane as described in claim 1 in which proportional speed mechanism in the vehicle is mounted on a carriage having the rotatable ground contacting member of known circumference, said proportional speed mechanism including the pair of rotatable cones driven from said rotatable ground contacting member, a pair of friction wheels engaging with and driven by the surfaces of the cones, the third friction wheel engageable with and adapted to be driven by the surface of either of the cones, and the pendulum means; and an assembly of the recording means separable from said proportional speed mechanism and said carriage attached to said proportional speed mechanism by flexible shafts, said recording mechanism including the chart table, the recording sheet, and the stylus carriage.

6. In apparatus as claimed in claim 1, a second pendulum means, gearing associated with said second pendiulum means in a drive which actuates the drive roller for moving the stylus whereby when the vehicle ascends the tilting of the second pendulum means will cause engagement of said gearing to move said stylus in one direction and when the carriage descends tilting of the pendulum means will cause engagement of said gearing in the opposite direction of rotation.

RALPH D. MOYER.

REFERENCES CITED

The following references are of record in the file of this patent:

UNITED STATES PATENTS

| Number | Name | Date |
|---|---|---|
| 16,902 | Adams et al. | Mar. 31, 1859 |
| 32,959 | Bogardus | July 30, 1861 |
| 616,878 | Batson | Jan. 3, 1899 |
| 1,109,667 | Dikeman | Sept. 8, 1914 |
| 1,380,768 | Buckle | June 7, 1921 |
| 1,890,607 | Hite | Dec. 13, 1932 |
| 2,136,944 | Hart | Nov. 15, 1938 |
| 2,149,440 | Jackson | Mar. 7, 1939 |
| 2,208,707 | Spitzer | July 23, 1940 |
| 2,337,044 | Holmes et al. | Dec. 21, 1943 |
| 2,345,076 | Spencer | Mar. 28, 1944 |

FOREIGN PATENTS

| Number | Country | Date |
|---|---|---|
| 15,568 | France | May 21, 1912 |
| | (1st add. to No. 420,600) | |
| 21,298 | France | May 4, 1920 |
| | (1st add. to No. 496,620) | |
| 97,266 | Switzerland | Jan. 2, 1923 |
| 124,749 | Germany | Nov. 6, 1901 |
| 263,213 | Germany | Aug. 4, 1913 |
| 523,511 | France | Apr. 23, 1921 |